(12) United States Patent
Young et al.

(10) Patent No.: US 7,734,387 B1
(45) Date of Patent: Jun. 8, 2010

(54) MOTION PLANNER FOR UNMANNED GROUND VEHICLES TRAVERSING AT HIGH SPEEDS IN PARTIALLY KNOWN ENVIRONMENTS

(75) Inventors: Shih-Yih Young, Marion, IA (US); Kristen M. Jerome, Central City, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 374 days.

(21) Appl. No.: 11/394,403

(22) Filed: Mar. 31, 2006

(51) Int. Cl.
*G01C 22/00* (2006.01)

(52) U.S. Cl. .................. 701/23; 701/209; 701/301

(58) Field of Classification Search .................. 701/23, 701/209, 301
See application file for complete search history.

(56) References Cited

U.S. PATENT DOCUMENTS

| | | | | |
|---|---|---|---|---|
| 5,276,383 | A * | 1/1994 | Nishimura et al. | 318/568.15 |
| 6,151,539 | A * | 11/2000 | Bergholz et al. | 701/25 |
| 7,272,474 | B1 * | 9/2007 | Stentz et al. | 701/26 |
| 2005/0216182 | A1 * | 9/2005 | Hussain et al. | 701/200 |

OTHER PUBLICATIONS

The Focussed D* Algorithm for Real-Time Replanning; Anthony Stentz, Robotics Institute, Carnegie Mellon University, Pittsburgh, Pa 15213; In Proceedings of the International Joint Conference on Artificial Intelligence, Aug. 1995.
UAV Cooperative Path Planning; P.R. Chandler, S. Rasmussen, Flight Control Division, Air Force Research Laboratory, Wright-Patterson AFB, OH; M. Patcher, Department of Electrical & Computer Engineering, Air Force Institute of Technology, Wright-Patterson AFB, OH; American Institute of Aeronautics and Astronautics; AIAA Guidance, Navigation & Control Conference & Exhibit, Denver, CO, Aug. 2000.

* cited by examiner

*Primary Examiner*—Mark Hellner
*Assistant Examiner*—Helal A Algahaim
(74) *Attorney, Agent, or Firm*—Matthew J. Evans; Daniel M. Barbieri (57) ABSTRACT

A motion planner for unmanned ground vehicles capable of traversing at high speeds to reach remote locations in partially known environments. The motion planner comprises a global path planner and a local path planner in communication with the global path planner. The global path planner determines a path to reach a goal location. The local motion planner revises the path determined by the global path planner to generate a motion profile accounting for constraints on the maneuverability of the unmanned ground vehicle. The motion profile provides a revised path for being traversed by the unmanned ground vehicle to reach the goal location.

15 Claims, 10 Drawing Sheets

MOTION PLANNER FOR UNMANNED GROUND VEHICLES TRAVERSING AT HIGH SPEEDS IN PARTIALLY KNOWN ENVIRONMENTS

FIELD OF THE INVENTION

The present invention relates generally to the field of unmanned ground vehicles (UGV), or the like, and more particularly to a motion planner for unmanned ground vehicles that are capable of traversing at high speeds to remote destinations in partially known environments.

BACKGROUND OF THE INVENTION

The use of unmanned ground vehicles (UGV) has become wide-spread due primarily to the ability of such vehicles to travel into unknown and hazardous environments that otherwise can only be reached by manned vehicles with high safety risks and/or operational costs. Depending on operational requirements and cost constraints, unmanned ground vehicles can be designed with different levels of autonomy. The level of autonomy is usually measured by the frequency of human monitoring and assistance. Unmanned ground vehicles with high levels of autonomy are generally equipped with a guidance system that can autonomously generate appropriate vehicle guidance commands to lead the unmanned vehicles safely to their destinations while avoiding obstacles detected during traversal. As a result, these unmanned vehicles can continue to operate autonomously for extended periods of time.

Unmanned Ground Vehicles operating in outdoor unstructured or off-road environments must often deal with previously unknown obstacles discovered by their onboard perception sensors during traversal. Consequently, it is desirable that the motion planner residing in the guidance system be able to replan a safe path to lead the unmanned ground vehicle away from newly detected obstacles. In addition, future unmanned ground vehicles may be required to traverse at speeds significantly higher than possible in current unmanned ground vehicles, especially in applications where such vehicles must operate alongside manned vehicles or must reach remote destinations. However, when traveling at high speeds, the guidance system of an unmanned vehicle has only a very limited time to perform replanning. Therefore, rapid motion replanning is essential to avoid moving in the undesirable direction and risking collision with obstacles.

In general, motion planning for long-range missions can be divided into two stages: pre-mission path planning and real-time motion planning. During the pre-mission path planning stage, a reference path (position only) is determined that is free of obstacles based on a priori information such as maps, satellite images, and the like. After the mission has begun, real-time motion planning utilizes the reference path determined during pre-mission path planning to generate high-level guidance commands such as position, velocity, heading, and the like, that can be safely followed by the vehicle control system.

Conventionally, local path planning is used to revise the reference path determined during the pre-mission path planning to avoid obstacles detected en route. This is primarily because local path planning is simple to implement and works well in simple obstacle settings, such as where the ground vehicle must maneuver around a small obstacle. However, local path planners are vehicle-centric and only use information provided by the vehicle's onboard perception sensors about the vicinity of the ground vehicle. In addition, local path planners do not carry terrain information and do not register obstacle geo-locations in a global coordinate system. Thus, local path planners are incapable of negotiating complex obstacle settings such as a blocked urban canyon, a destroyed bridge, or the like. In such instances, the local path planner will be unable to revise the reference path to generate an obstacle-free path. Consequently, an unmanned ground vehicle employing only local path planning in combination with pre-mission path planning will be trapped because the vehicle's guidance system cannot find a way past the obstacle to the vehicle's destination.

Consequently, it would be desirable to provide a motion planner for an unmanned ground vehicle that is capable of traversing at high speeds in partially known environments while negotiating complex obstacle settings. Such a motion planner should construct high-level guidance commands such as position, velocity, heading, and the like, that are within the capability of the vehicle control system (i.e., guidance commands can be followed by the vehicle control system), lead the unmanned ground vehicle to its destination while avoiding obstacles, and minimize the cost of traversal.

SUMMARY OF THE INVENTION

Accordingly, the present invention is directed to a motion planner for unmanned ground vehicles that are capable of traversing at high speeds in partially known environments while negotiating complex obstacle settings. In exemplary embodiments, the motion planner is capable of constructing a motion profile providing high-level guidance commands such as position, velocity, heading, and the like, that are within the capability of the vehicle control system (i.e., guidance commands can be followed by the vehicle control system) of the unmanned ground vehicle and leading the unmanned ground vehicle to its destination while avoiding obstacles and minimizing the cost of traversal.

In exemplary embodiments, the motion planner comprises a global path planner and a local motion planner in communication with the global path planner. If a reference path determined by pre-mission planning is blocked by obstacles, the global path planner constructs an alternative path to a goal location that is located at the reference path and is free of obstacles. The local motion planner revises the path determined by the global path planner to generate a motion profile accounting for one or more constraints on the maneuverability of the unmanned ground vehicle. In this manner, a smoothed path is determined which allows the unmanned ground vehicle to traverse the revised path at a speed greater than the speed at which the unmanned ground vehicle can traverse the path determined by the global path planner alone, while avoiding obstacles detected en route.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings. It is to be appreciated that corresponding reference numbers refer to generally corresponding structures.

Figure 1:
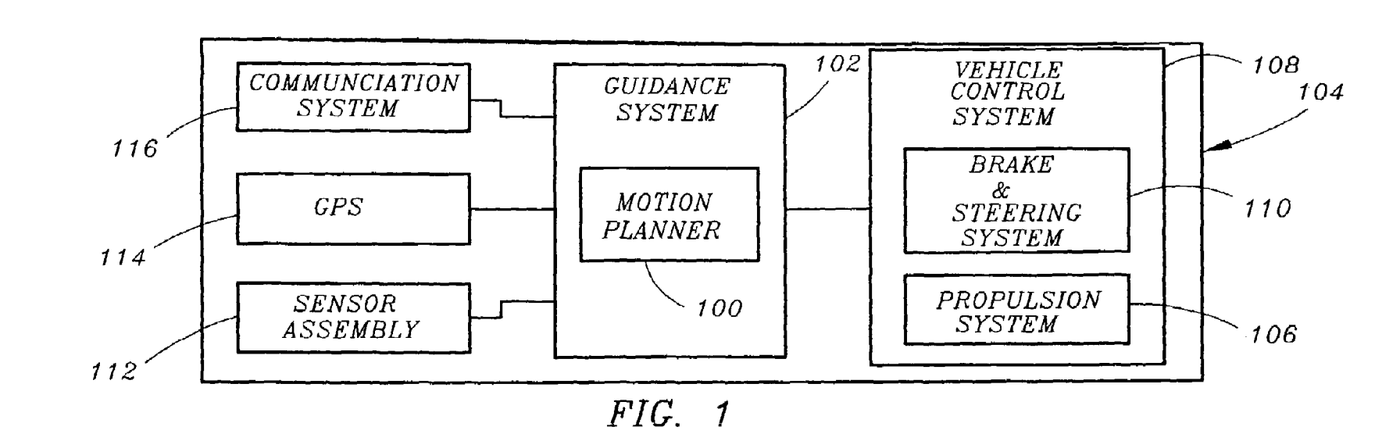
FIG. 1 is a block diagram illustrating an unmanned ground vehicle having a guidance system implementing a motion planner in accordance with an exemplary embodiment of the present invention.

FIG. 1 illustrates a motion planner 100 employed within the guidance system 102 of an unmanned ground vehicle 104 in accordance with an exemplary embodiment of the present invention. The unmanned ground vehicle 104 comprises any vehicle which is capable of navigating a path to a destination with some level of autonomy, independent of human control. For example, in the embodiment illustrated, the guidance system 102 is coupled to a propulsion system 106 including an engine or motor, drive train, wheels or tracks, and the like, necessary for propelling the vehicle 104, a vehicle control system 108 including steering and braking systems 110 for steering the ground vehicle 104, braking or slowing the vehicle 104, and the like. The guidance system 102 may further be coupled to a sensor assembly 112 for sensing obstacles surrounding the vehicle, a global positioning system (GPS) 114 for determining the position of the vehicle 104 as it traverses the path, and a communication system 116 for providing communication between the vehicle 104 and a remotely located operator, computer system, or the like.

Figure 2:
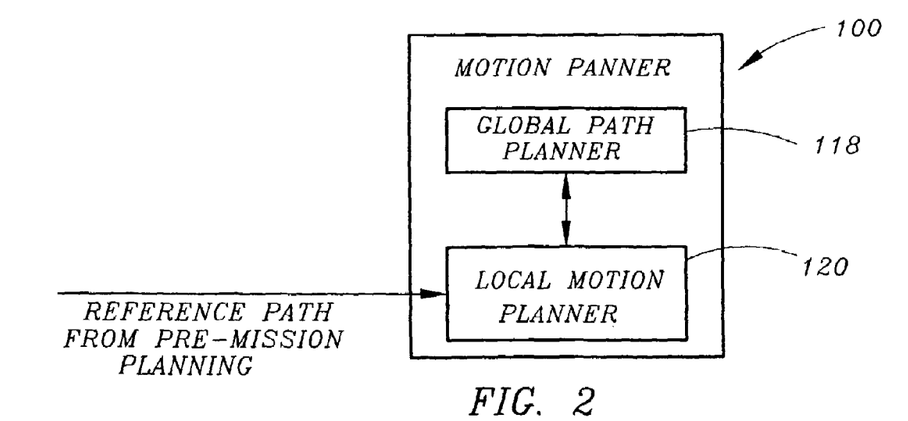
FIG. 2 is a block diagram illustrating the motion planner shown in FIG. 1, in accordance with an exemplary embodiment of the present invention.
Figure 3:
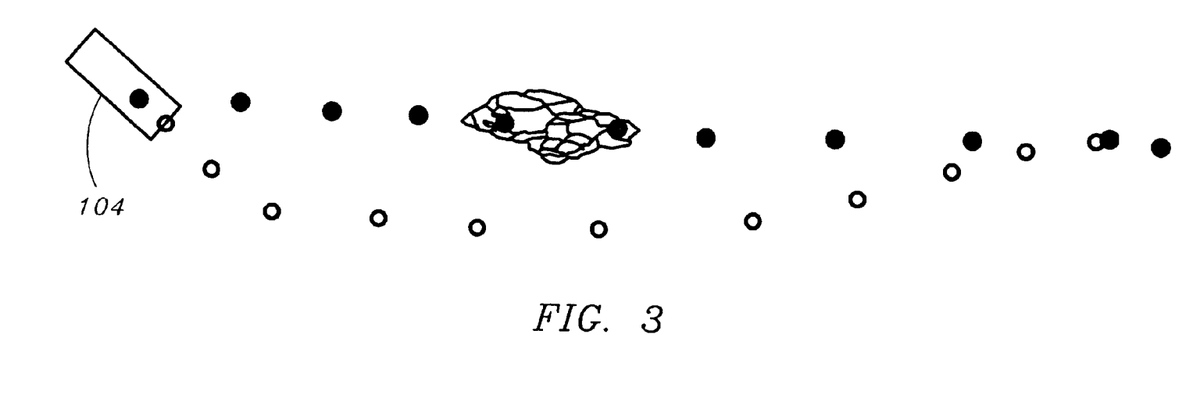
FIG. 3 is a diagrammatic map view illustrating a path taken by an unmanned ground vehicle around a simple obstacle.
Figure 4:
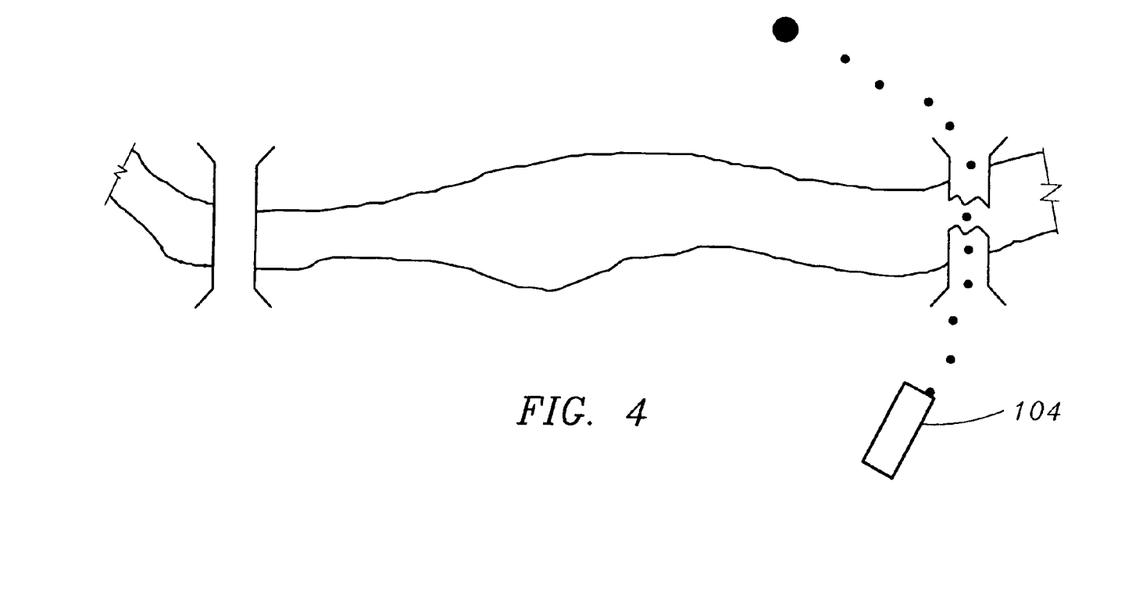
FIG. 4 is a diagrammatic map view illustrating a complex obstacle blocking the path of an unmanned ground vehicle.

FIG. 2 further illustrates the motion planner 100 shown in FIG. 1. If there are obstacles blocking the reference path, conventionally, local path planning is used to revise the reference path determined during the pre-mission path planning. This is primarily because local path planning is simple to implement and works well in simple obstacle settings, such as where the ground vehicle must maneuver around a small obstacle as shown in FIG. 3. However, as shown in FIG. 4, local path planners may be incapable of negotiating complex obstacle settings such as a blocked urban canyon, a destroyed bridge, or the like. In such instances, the local path planner may be unable to revise the reference path to generate an obstacle-free path. Consequently, an unmanned ground vehicle employing only local path planning in combination with pre-mission path planning may become trapped because the vehicle's guidance system cannot find a way past the obstacle to the vehicle's destination.

To overcome such shortcomings in the prior art, the motion planner 100 of the present invention comprises a global path planner 118 providing global path planning to revise a reference path due to the obstacle blockage, and a local motion planner 120 providing local motion planning for a look-ahead distance anchored on the revised path determined via global path planning by the global path planner 118. The global path planner 118 carries terrain information and registers obstacle geo-locations in a common global coordinate system, for example via position information obtained using the global positioning system (GPS) 114, sensor assembly 112, communication system 116, or the like, of the unmanned ground vehicle 104 shown in FIG. 1. In this manner, the global path planner 118 is more robust and can negotiate complex obstacle settings, such as that shown in FIG. 4, and will not be trapped in them. The motion planner 100 of the present invention may utilize any conventional global path planning algorithm. For example, in one exemplary embodiment, the motion planner 100 may utilize the Focused D* algorithm developed by the Robotics Institute at Carnegie Mellon University. The Focused D* path planning algorithm uses Artificial Intelligence (AI) to enable rapid replanning capability, which makes the Focused D* algorithm suitable for revising the reference path for a ground vehicle 104 in high vehicle speed applications. The Focused D* path planning algorithm is described in Stentz, A., "The Focussed D* Algorithm for Real-Time Replanning," Proceedings of the International Joint Conference on Artificial Intelligence, August, 1995, which is herein incorporated by reference in its entirety.

Figure 5:
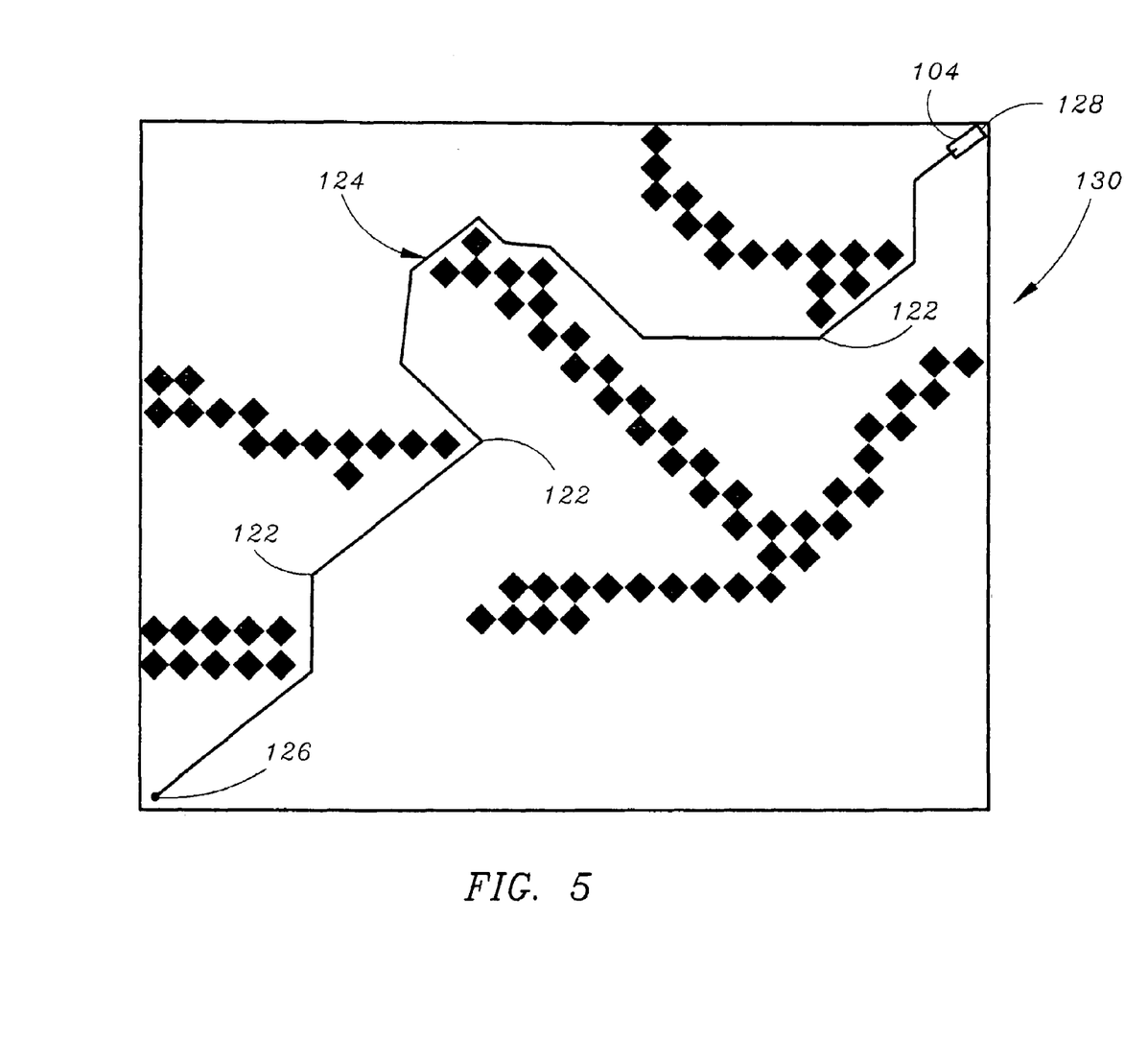
FIG. 5 is a diagrammatic map view illustrating a polygonal path through a partially-known environment generated using global path planning by the global path planner of the motion planner shown in FIG. 2.

The motion planner 100 further includes a local motion planner 120 to take into account kinematic and dynamic constraints of the ground vehicle 104. In exemplary embodiments, as shown in FIG. 5, the global path planner 118 does not take into account kinematic and dynamic constraints of the ground vehicle 104 when determining a path. Consequently, the path generated by the global path planner 118 may, without correction, include discontinuities 122. Discontinuities 122 comprise sharp turns along the path calculated by the global path planner 118, wherein the ground vehicle 104 must abruptly change direction or course. Thus, if the ground vehicle 104 were to follow this path, without further correction or smoothing, the path could typically only be traversed at very low speeds. Due to the discontinuities 122, the path 124 developed by the global path planner 118 is hereinafter referred to as a polygonal path 124. The local motion planner 120 refines or smoothes the polygonal path 124 so that the path may be traversed safely (i.e., without accident, severe tipping, roll over, etc.) by the unmanned ground vehicle 104 at a high speed (e.g., at a speed greater than the speed at which the ground vehicle 104 could safely traverse the polygonal path 124).

In accordance with the present invention, the local motion planner 120 anchors on the polygonal path 124 generated by the global path planner 118, while generating a motion profile that contains guidance commands for the unmanned ground vehicle 104 that account for the position, velocity, and heading of the ground vehicle 104. The motion planner 100 will not be trapped by complex obstacle settings since the global path planner 118 provides a general obstacle-free path to the goal location, allowing the motion planner 100 to find paths out of complex obstacle settings. In addition, the local motion planner 120 of the present invention takes into account kinematic and dynamic constraints of the ground vehicle 104. With this layered approach, the motion planner 100 provides guidance commands that enable the vehicle control system 108 to perform high speed traversal while avoiding obstacles detected en route.

Figure 6:
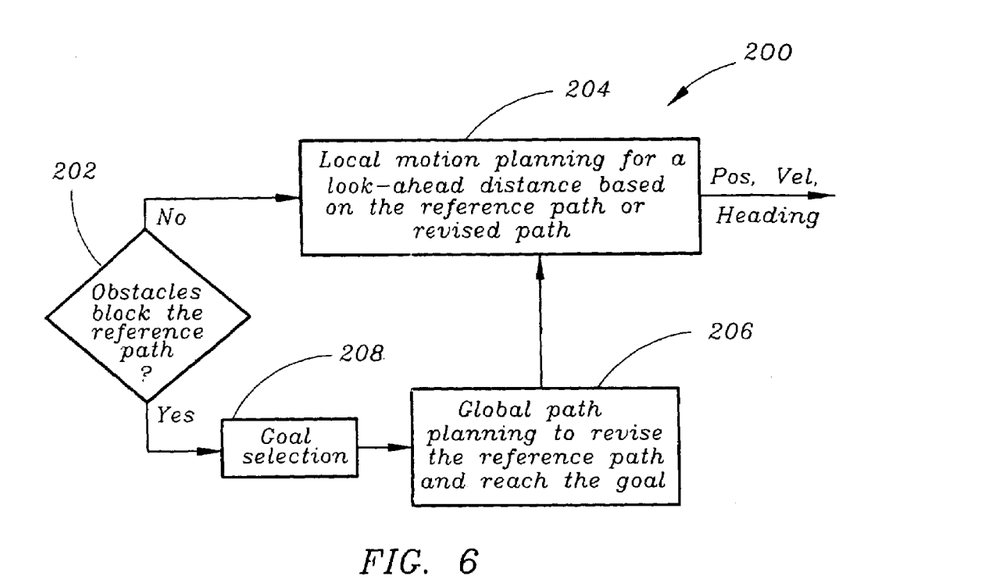
FIG. 6 is a flow diagram illustrating an exemplary method employed by the motion planner shown in FIG. 2 for navigating the unmanned ground vehicle shown in FIG. 1 to a goal location that is located on the reference path and is free of obstacles.

FIG. 6 illustrates the method 200 employed by the motion planner 100 for navigating the unmanned ground vehicle 104 to the destination. As shown in FIG. 4, after a reference path is generated by pre-mission path planning and the ground vehicle 104 begins traversing along the reference path, a determination is made, at step 202, whether an obstacle or obstacles block the reference path being followed. If no obstacle is detected (e.g., via the sensor assembly 112 of the unmanned ground vehicle 104, or the like), the local motion planner 120 provides local motion planning based on the reference path, at step 204, taking into account vehicle capability limits for allowing the ground vehicle 104 to operate at a higher speed. However, if an obstacle is detected to block the reference path (e.g., via the sensor assembly 112 of the unmanned ground vehicle 104), the global path planner 118 provides global path planning to revise the reference path due to the obstacle blockage, at step 206, to determine a revised path (i.e., a polygonal path 124) to a goal location. The goal location that is on the reference path and free of obstacles is selected, at step 208, to be the ending point of the revised path. The local motion planner 120 then provides local motion planning based on the revised (polygonal) path, at step 204, calculating a motion profile that is within vehicle capability limits. This motion profile smoothes discontinuities 122 in the path for allowing the ground vehicle 104 to operate at a higher speed. Calculating a motion profile that takes into account the kinematic and dynamic constraints of the ground vehicle 104 requires significant computation. Therefore, for real-time applications, the local motion planner 120 may only generate the motion profile for a look-ahead distance that is a function of vehicle speed and reaction time (e.g., 4 seconds). In this manner, the local motion planner 120 anchors on the polygonal path 124 generated by the global path planner 118, while generating a motion profile that contains guidance commands for the unmanned ground vehicle 104 that account for the position, velocity, and heading of the ground vehicle 104.

As shown in FIG. 5, the global path planner 118 employing a global path planning algorithm, such as the Focused D* algorithm, or the like, creates a polygonal path 124 from the starting location 126 of the ground vehicle 104 to the goal location 128. A polygonal path is defined as a collection of straight lines created from exiting the center of one cell to entering the center of another cell within a cellular decomposition of the environment 130 being traversed by the unmanned ground vehicle 104. Due to discontinuities 122 in the direction of the polygonal path 124, the path 124 cannot be traversed by the unmanned ground vehicle 104 at high speeds. However, the polygonal path 124 does provide a generally obstacle-free path to the goal location 128 and can be computed relatively quickly since vehicle's kinematic and dynamic constraints are not considered.

The motion planner 100 of the present invention couples the global path planner 118, employing a global path planning algorithm such as the Focused D* algorithm, or the like with the local motion planner 120 to generate guidance commands that comply with the ground vehicle's kinematic and dynamic constraints. In exemplary embodiments, the local motion planner 120 adapts the Fillet algorithm proposed by researchers at the Air Force Research Laboratory to take into account ground vehicle's kinematic constraints while constructing a smooth path that can avoid vehicle rollover during high speed traversal. The Fillet algorithm is described in Chandler, P., Rasmussen, S., and Pachter, M., "UAV Cooperative Path Planning," *Proceedings of AIAA Guidance, Navigation, and Control Conference*, August, 2000, which is herein incorporated by reference in its entirety. The Fillet algorithm creates a smooth path based on three anchor points, A, B and C, by searching for tangential arcs of radius r that comply with the vehicle's kinematic constraints. These three anchor points, A, B and C, may be determined based on the polygonal path 124 generated by the global path planner 118. As a result, the local motion planner 120 is tied to the global path planner 118 and will not be trapped by complex obstacle settings.

Figure 7:
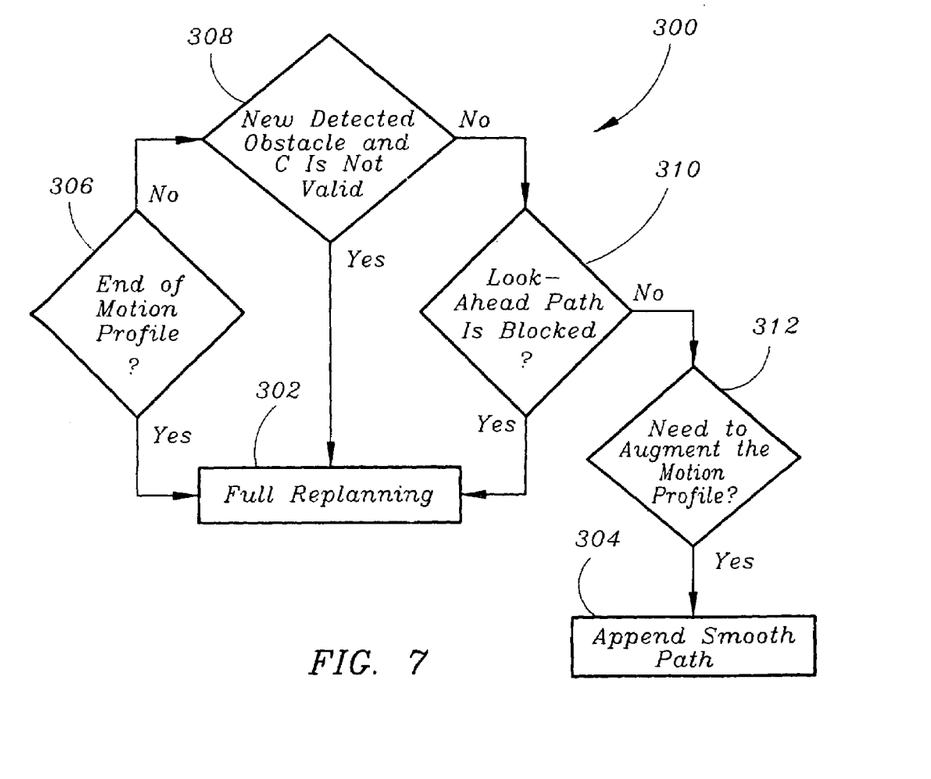
FIG. 7 is a flow diagram illustrating an exemplary method for setting the motion planning mode of the motion planner shown in FIG. 2.

Exemplary high-level logic for the real-time motion planning algorithm 300 implemented by the motion planner 100 of the present invention is shown in FIG. 7. When the motion planner 100 needs to revise the reference path, it sets the motion planning mode as either "Full_Replanning," at step 302, thereby causing the global path planner 118 to re-compute the polygonal path and the local motion planner 120 to calculate a revised motion profile based on the re-computed polygonal path for at least one look-ahead distance, or "Append_Smooth_Path," at step 304, so that the local motion planner 120 appends a segment of motion profile to a saved motion profile until the total accumulated distance for the motion profile is greater than the desired look-ahead distance. As shown in FIG. 7, if the ground vehicle 104 has reached the end of the motion profile, at step 306, the motion planning mode is set to "Full_Replanning," at step 302, so that the motion profile is re-computed for at least one look-ahead distance. However, if the ground vehicle 104 has not reached the end of the motion profile, at step 306, the motion planner 100 will then determine whether there are new detected obstacles and the last anchor point (i.e., point C) used for constructing the look-ahead motion profile is no longer a trusted cell (i.e., point C is no longer on the polygonal path determined by the global path planner 118), at step 308. If there are new detected obstacles and the last anchor point used for constructing the look-ahead motion profile is no longer a trusted cell, in step 308, the motion profile is completely replanned for at least one look-ahead distance. The motion planning mode is therefore set to be "Full_Replanning," at step 302. The motion planner 100 will further determine whether there are obstacles on the smoothed path within the planned look-ahead distance, at step 310, for example, by using data received from sensor assembly 112 (FIG. 1). If there are obstacles on the smoothed path within the planned look-ahead distance, at step 310, the motion planning mode of the local motion planner 120 is set to "Full_Replanning," at step 302, so that the motion profile is re-computed for at least one look-ahead distance. However, if there are no obstacles on the smoothed path within the planned look-ahead distance, at step 310, a determination is made whether the accumulated distance for the remaining motion profile is less than the required look-ahead distance for the current speed of the unmanned ground vehicle 104, at step 312. If the accumulated distance for the remaining motion profile is less than the required look-ahead distance for the current vehicle speed, at step 312, the motion planning mode is set to "Append_Smooth_Path," at step 304, so that the local motion planner 120 appends a segment of motion profile to the saved motion profile until the total accumulated distance for the motion profile is greater than the desired look-ahead distance. Steps 308 through 312 are repeated at the obstacle occupancy update rate of the ground vehicle 104.

Figure 8:
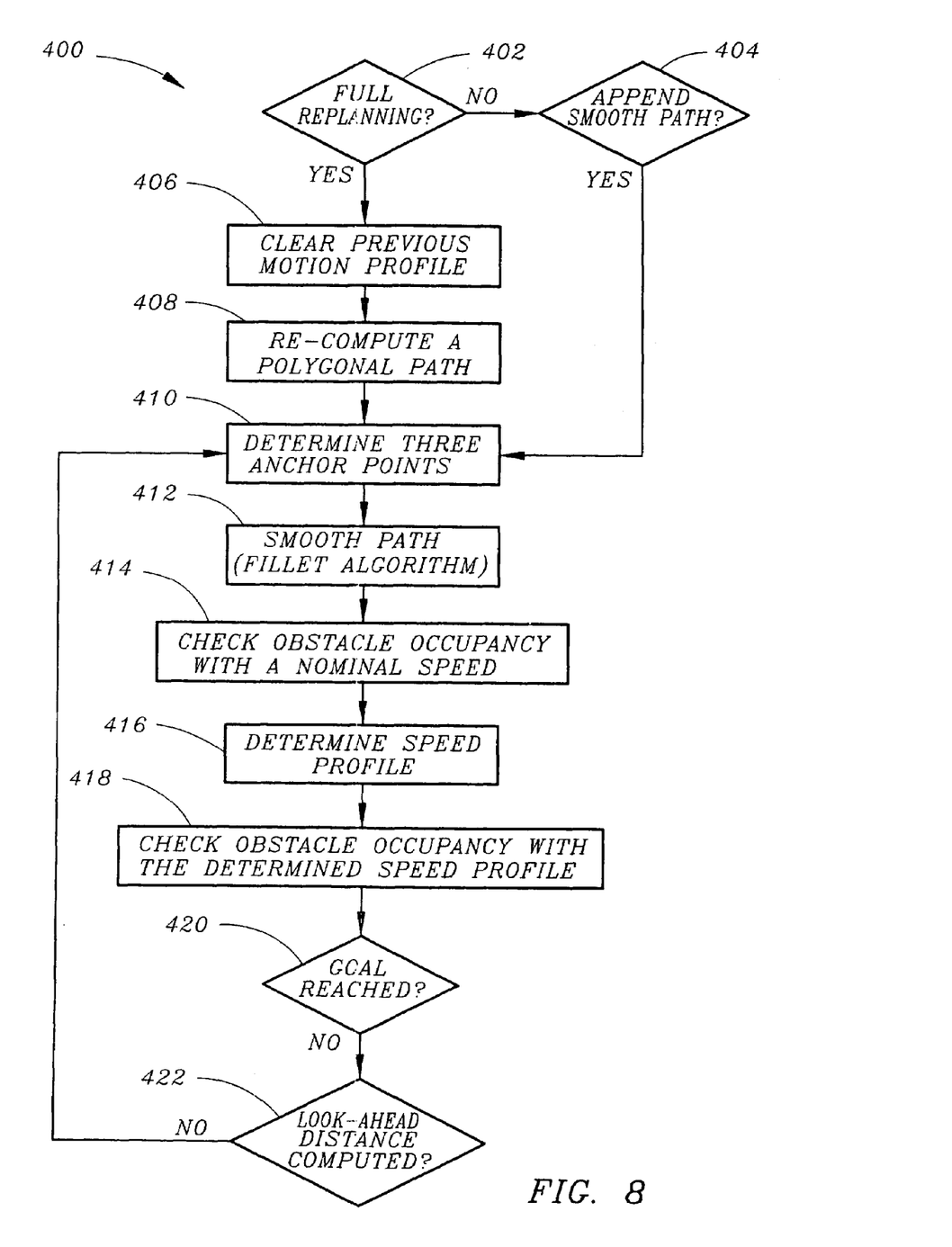
FIG. 8 is a flow diagram illustrating a method implemented by the local motion planner shown in FIG. 2 for determining a motion profile in accordance with an exemplary embodiment of the present invention.
Figure 9:
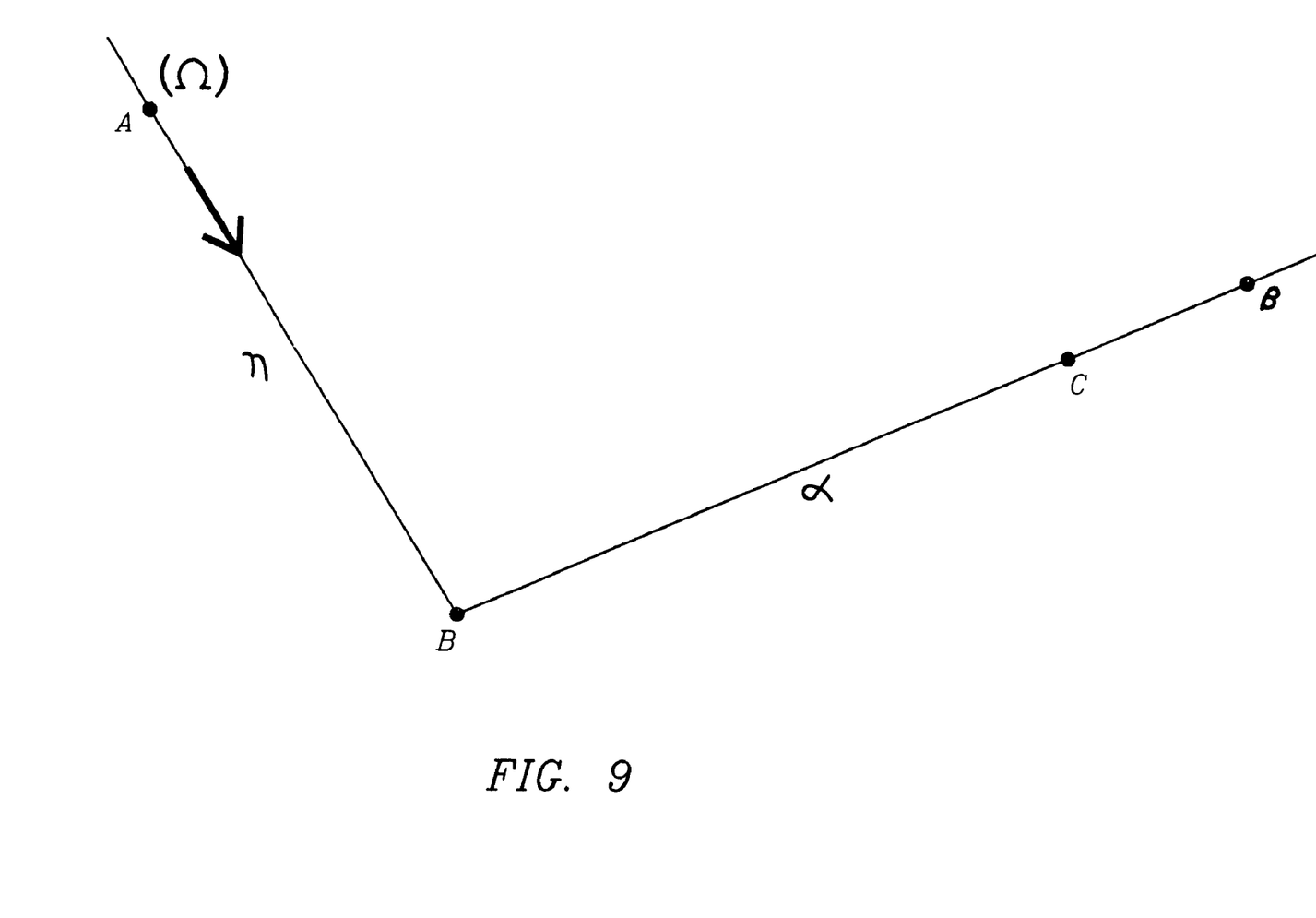
FIG. 9 is a diagrammatic view illustrating the selection of anchor points by the motion planner shown in FIG. 2 in accordance with an exemplary embodiment of the present invention.

FIG. 8 illustrates an exemplary method 400 used by the motion planner 100 for determining a motion profile in accordance with an exemplary embodiment of the present invention. First, a determination is made, at step 402 and step 404, whether it is necessary to completely re-compute the motion profile or append an additional segment to the motion profile. In exemplary embodiments, the motion planning mode selected in accordance with the method 300 illustrated in FIG. 7 is used for this determination. If the motion profile is to be completely re-computed (i.e., the motion planning mode is set to "Full_Replanning" at step 302 of method 300), the global path planner 118 re-computes the polygonal path 124. If instead, a segment is to be appended to the motion profile (i.e., the motion planning mode is set to "Append_Smooth_Path" at step 304 of method 300), three anchor points (i.e., anchor points A, B, and C in FIG. 9) are determined, at step 410, based on the polygonal path 124. A Fillet algorithm is then used to find a smooth path referenced to the three anchor points complying with the ground vehicle's kinematic constraints of maneuverability, at step 412, to avoid vehicle rollover during high speed traversal. Obstacle occupancy is checked on a nominal path that is propagated at a $\delta$ Hz rate (e.g., $\delta$=20) with a speed of $\eta$ miles/hour (e.g., $\eta$=30 miles/hr), at step 414. The three anchor points and the curve determined by the Fillet algorithm are used to construct the nominal path. The speed of $\eta$ miles/hour is used to check obstacle occupancy and to screen the obstacle-free path for the speed profile determination at next step. A speed profile is then determined, at step 416, to take into account vehicle's dynamic constraints such as limits of acceleration/deceleration. The obstacle occupancy on the look-ahead motion profile is checked, at step 414, with the determined speed profile. The local motion planner repeats steps 402 through 418 until the motion profile for at least the required look-ahead distance is computed, at step 422, or until it is determined that the goal location has been reached, at step 420.

Figure 10:
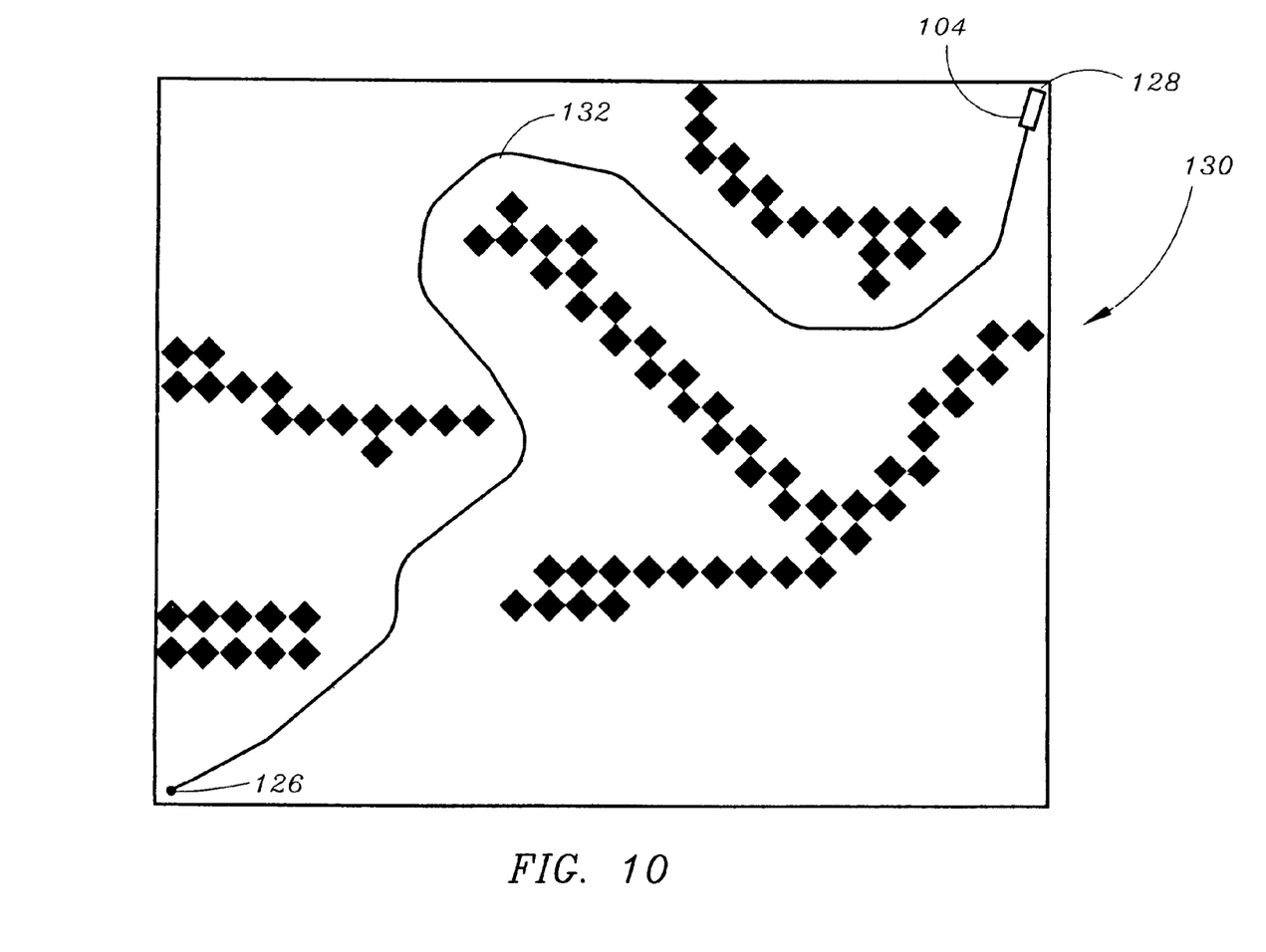
FIG. 10 is a diagrammatic map view illustrating a revised smoothed path through the partially-known environment shown in FIG. 5, generated by the local motion planner shown in FIG. 2.

In this manner, the motion planner 100 is capable of constructing a motion profile providing high-level guidance commands such as position, velocity, heading, and the like, that are within the capability of the vehicle control system 108 (i.e., the guidance commands can be followed by the vehicle control system 108) of the unmanned ground vehicle 104 and leading the unmanned ground vehicle 104 to the destination while avoiding obstacles and minimizing the cost of traversal. FIG. 10 illustrates the smoothed path 132 generated by the motion planner 100 of the present invention. With a safe smooth path 132 defined, the ground vehicle 104 can perform high speed traversal through the environment 130 while avoiding obstacles detected en route.

Anchor Point Determination

Figure 11:
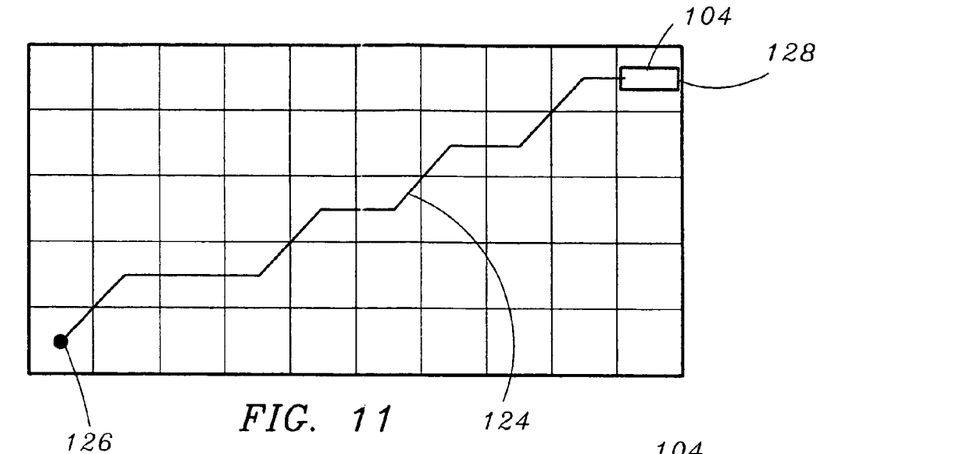
FIG. 11 is a diagrammatic map view illustrating a polygonal path generated by the global path planner of the motion planner shown in FIG. 2.
Figure 12:
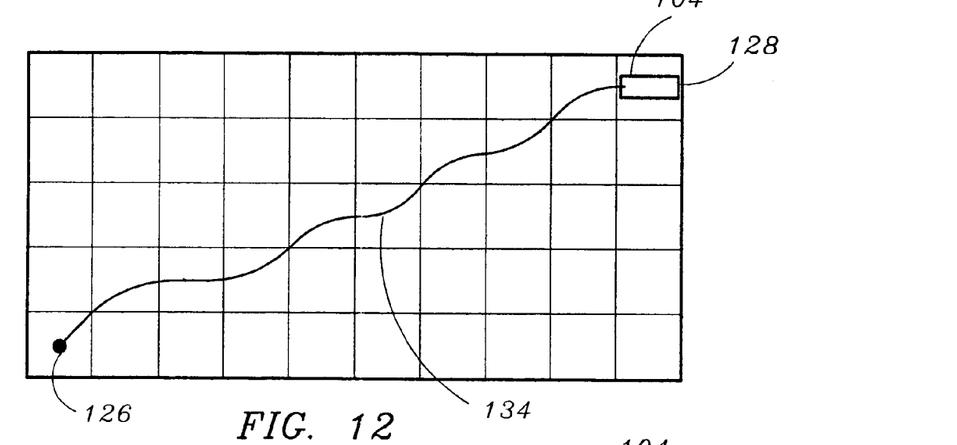
FIG. 12 is a diagrammatic map view illustrating a smoothed path generated by creating a motion profile via the use of consecutive anchor points.

The global path planner 118 generates a polygonal path 124 as shown in FIG. 11. It is contemplated that different methods may be used for determining the three anchor points, A, B and C, from this polygonal path 124. For example, every three consecutive points, where the first point is always the current ground vehicle location, can be set as anchor points, A, B and C. While this method results in a smooth path, the solution is not optimal because the radii used to fit the tangential arcs by the Fillet Algorithm are quite small and, therefore, require the ground vehicle 104 to travel at low speeds. FIG. 12 shows a revised path 134 created by selecting anchor points, A, B and C, in this manner. The path 134 is a smoothed version of the polygonal path 124.

Anchor points, A, B and C, may be found so that the revised path is further smoothed. In this embodiment, the polygonal path 124 determined by the global path planner 118 is collected from a starting point $\Omega$ to a location that is a distance $\beta$ away from the starting point $\Omega$. Distance $\beta$ is usually less than the range of onboard perception sensor. The starting point $\Omega$ may be the previous anchor point C, if it is still on the polygonal path 124 and no unknown obstacles have been detected. Otherwise, the current vehicle location will be used as the starting point $\Omega$ to track the polygonal path 124.

The location of each discontinuity 122 in the direction of collected polygonal path 124 is determined and stored in a heading change array which may be stored in memory provided by the guidance system, or the like. The last polygonal point collected is added to the heading change array since it cannot be determined whether a discontinuity exists at this point or not. Thus, the present invention assumes there is always a potential discontinuity in the direction of the path at the last point.

At the "Full_Replanning" mode, the current vehicle location is assigned as anchor point A. Otherwise, at the "Append_Smooth_Path" mode, the end of the saved motion profile is assigned as anchor point A. Anchor point C, which is the endpoint, is next determined. In exemplary embodiments, the initial estimate for anchor point C is the first location in the heading change array that is at least a distance $\alpha$ away from the first element of the heading change array. Since the last point in the collected polygonal path will always be in the heading change array, the last point will be assigned as anchor point C if the collected solution is a straight line.

Anchor point B is located at a distance $\eta$ away, from anchor point A and the heading of the $\overline{AB}$ vector is the same as the vehicle heading. Distance $\eta$ is the distance between anchor point C and point B', which is the midpoint between the first location in the heading change array and point C. In cases where there is only one heading change, point B' is simply the midpoint between point A and point C. However, if $\eta > \alpha$ and the heading difference between the $\overline{AB}$ vector and the $\overline{AC}$ vector is within a predetermined threshold, distance $\eta$ will be limited to be no greater than distance $\alpha$ so the revised path 134 generated by the Fillet algorithm will not deviate too far away from the polygonal path 124.

Figure 13:
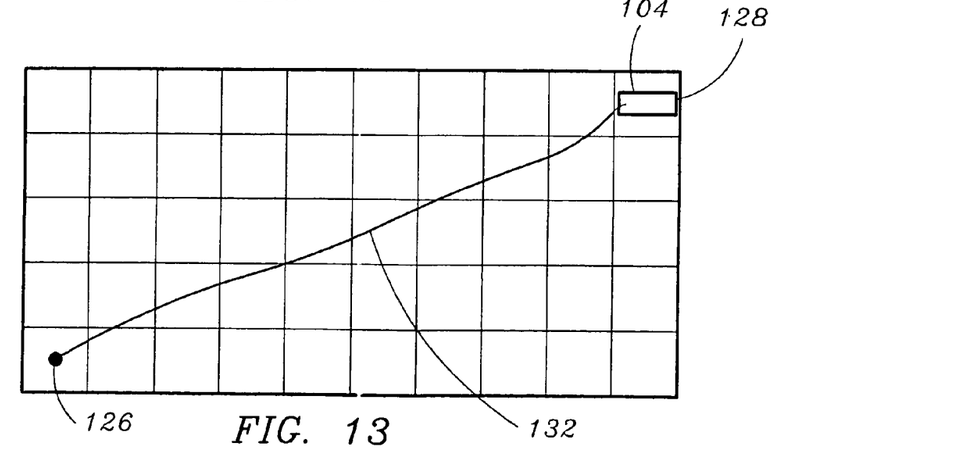
FIG. 13 is a diagrammatic map view illustrating a smoothed path generated by creating a motion profile via the use of anchor points selected in accordance with an exemplary embodiment of the present invention.

After a set of three anchor points, A, B, and C, is determined, the anchor points are passed to the Fillet algorithm for consideration of vehicle's kinematic constraints. If this set of anchor points is rejected by the Fillet algorithm, a new set of anchor points may be computed. In such cases, anchor point A is retained for this new set of anchor points. However, anchor point B and anchor point C may be adjusted. For example, in embodiments of the present invention, anchor point C may be pulled in one cell closer to anchor point A and anchor point B recomputed using the procedure described herein. FIG. 13 illustrates a smoothed path 132 created using the Fillet algorithm with anchor points determined using this method. Because the smoothed path 132 contains fewer changes in heading it is more suitable for high speed traversal than the path 134 illustrated in FIG. 12 which was created by selecting consecutive points.

As described, the polygonal path 124 from a starting point Ω is collected for the determination of three anchor points, A, B, and C. A backpointer of the starting point Ω may be used to trace the polygonal path 124 since the backpointer is used by the global planning algorithm (e.g., Focused D*) to point to the next cell on the polygonal path 124. Therefore, by following successive backpointers, the polygonal path 124 may be tracked. However, it will be appreciated that, if the starting point Ω is not on the polygonal path 124, this approach may track an invalid path and can even lead the ground vehicle 104 to collide with obstacles. Thus, the starting point Ω should first be verified to be on the polygonal path 124 determined by the global path planner 118 using a global path planning algorithm such as Focused D*. In accordance with the present invention, cells traversed by the polygonal path 124 are designated as trusted cells. In this manner, the motion planner 100 need only verify the starting point Ω is in one of trusted cells to verify that the starting point Ω is on the polygonal path 124.

When the global path planner 118, using a global path planning algorithm such as Focused D*, determines a new polygonal path 124, trusted cells are determined and saved in a trusted cell array which may be stored in memory provided by the guidance system 102. This trusted cell array is used to verify whether the starting point Ω is in one of these trusted cells. If the starting point Ω is not in a trusted cell, the starting point Ω is invalid. To locate a new starting point Ω, a search is performed to find a trusted cell that is reasonably close to starting point Ω. For example, a circular sweep search around starting point Ω may be performed. When a trusted cell is found, a straight line is propagated from starting point Ω to this trusted cell. The motion planner 100 checks this straight line path for obstacles because it is possible for obstacles to be located between the starting point Ω and this trusted cell.

After a trusted cell is found with no obstacles between the starting point Ω and the cell, the heading difference between the predicted vehicle heading at the starting point Ω and the heading of the vector from the starting point Ω to the center of this trusted cell is computed. If this heading difference is less than ninety degrees, the center of the cell is assigned as the new starting point to track the polygonal path 124. In this manner, the motion planner 100 prevents the vehicle from traveling in reverse. If a trusted cell does not result from this process, the motion planner 100 may then search around the starting point Ω without the ninety-degree restriction.

Fillet Algorithm

Figure 14:
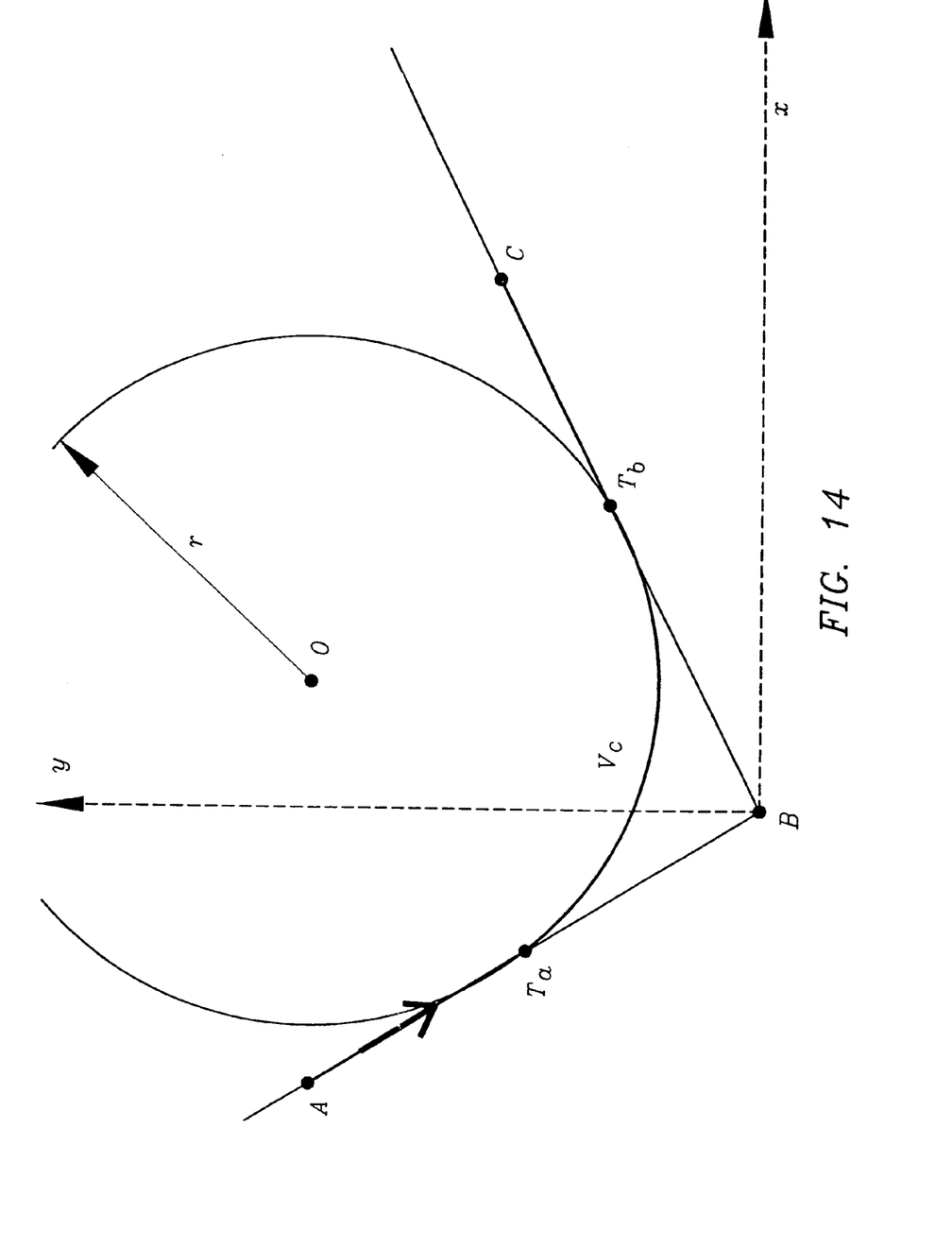
FIG. 14 is a diagrammatic view illustrating the application of the Fillet algorithm by the motion planner shown in FIG. 2 for generating a motion profile in accordance with an exemplary embodiment of the present invention.

Referring now to FIG. 14, an exemplary Fillet algorithm suitable for use by the local motion planner 120 illustrated in FIG. 2 for smoothing the polygonal path 124 developed by the global path planner 118 is described. In exemplary embodiments, the Fillet algorithm takes into account kinematic constraints of the ground vehicle 104 to avoid vehicle rollover during high speed traversal. The Fillet Algorithm joins two polygonal segments formed by the three anchor points A, B, and C with a tangential arc of a radius r. The radius of the arc r is constrained by kinematic constraints of the ground vehicle 104 such as turning radius described as a function of vehicle curve speed $V_c$. With the addition of the curve created to connect two polygonal segments, the path becomes accessible to ground vehicles 104 traversing at high speeds thus preventing vehicle rollovers.

As shown in FIG. 14, to find the arc that is within the vehicle's kinematic constraints while optimizing speed, the Fillet algorithm attempts to fit the curve for the highest speed first. The Fillet algorithm assigns the curve speed $V_c$ as the maximum speed the vehicle is allowed to travel and uses a look-up table to find the corresponding turning rate. The radius r is determined by $$r = V_c / \text{Turning\_Rate} \quad (1)$$

where $V_c$ is the maximum curve speed. Based on the radius r, tangent lines $BT_a$ and $BT_b$ may be determined. The magnitude of the tangent lines $BT_a$ and $BT_b$ are determined as $$BT_a = r/\tan(\angle ABC/2) \quad (2)$$

The (x, y) coordinates of $T_a$ and $T_b$ are:

$$T_{ax} = \cos(\angle xBA) * BT_a + B_x \quad (3)$$

$$T_{ay} = \sin(\angle xBA) * BT_a + B_y \quad (4)$$

$$T_{bx} = \cos(\angle xBC) * BT_b + B_x \quad (5)$$

$$T_{by} = \sin(\angle xBC) * BT_b + B_y \quad (6)$$

The tangent points, $T_a$ and $T_b$ are located between line segments $\overline{AB}$ and $\overline{BC}$ respectively. The distance from $T_b$ to C should also be less than half of the magnitude of $\overline{BC}$ to give sufficient room to prepare for the next possible curve. If $T_a$ and $T_b$ cannot be determined with the initial value of the curve speed $V_c$, the curve speed $V_c$ is reduced by a predetermined amount $\Delta V$ and the local motion planner 120 again attempts to determine tangent points $T_a$ and $T_b$. This process will be repeated until a minimum speed value $V_c$ is reached or tangent points $T_a$ and $T_b$ are determined. If tangent points $T_a$ and $T_b$ still cannot be determined when $V_c$ is reduced to the minimum value, the set of anchor points A, B, and C are rejected by the Fillet algorithm and new anchor points A, B, and C are determined.

If tangent points $T_a$ and $T_b$ can be determined for a specific turning radius r, the path segment from anchor point A to tangent point $T_b$, not to anchor point C, is stored to determine a speed profile that complies with vehicle's dynamic constraints (e.g., limits of acceleration/deceleration, and the like).

Speed Profile Determination

Figure 15:
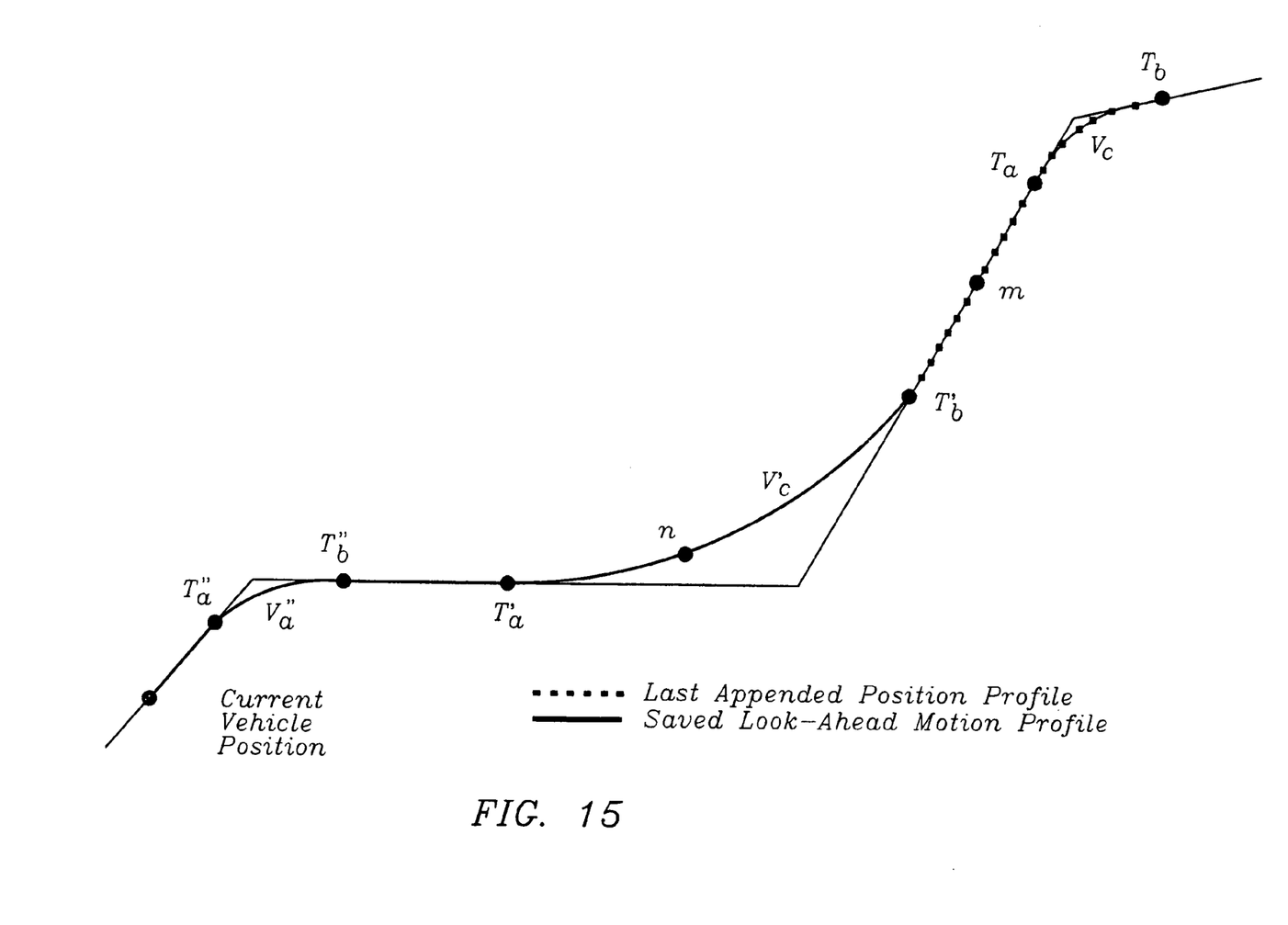
FIG. 15 is a diagrammatic view illustrating the generation of a speed profile by the motion planner shown in FIG. 2 in accordance with an exemplary embodiment of the present invention.

Referring now to FIG. 15, a speed profile determination algorithm in accordance with the present invention suitable for use by the local motion planner 120 illustrated in FIG. 2 for determining a speed profile is described. First, the speed $V_c$ for the last curve (i.e., the curve that is newly determined by the Fillet algorithm described in the discussion of FIG. 14) is maintained. The speed profile in the stored look-ahead motion profile is then adjusted to enable the last curve speed $V_c$ to be maintained. A determination is next made whether the last curve speed $V_c$ can be achieved at tangent point $T_a$ by using the following options, which are ordered in priority of most desirable option to the least desirable option.

Option I

The local motion planner 120 attempts to generate a speed profile wherein the ground vehicle 104 would accelerate from tangent point T'$_b$ to the midpoint m and decelerate to tangent point T$_a$, wherein point m is the midpoint between tangent points T'$_b$ and T$_a$. According to this speed profile, when the ground vehicle 104 enters the curve, constant speed is maintained. The maximum speed at point m is computed as follows.

$$V_c = V_m + at \tag{7}$$

where a is the nominal deceleration and t is the delta time to reach tangent point T$_a$ from point m. Equation (7) can be rewritten as $$t = \frac{(V_c - V_m)}{a} \tag{8}$$

The distance from tangent point T'$_b$ to tangent point T$_a$, denoted as TD, is $$TD = 2\left(V_m t + \frac{1}{2}at^2\right) \tag{9}$$

Substituting Equation (8) into Equation (9), Equation (9) provides:

$$TD = 2V_m\left(\frac{V_c - V_m}{a}\right) + a\left(\frac{V_c - V_m}{a}\right)^2 \tag{10}$$

Expanding Equation (10) further, provides $$TDa = V_c^2 - V_m^2 \tag{11}$$

$$V_m = \sqrt{V_c^2 - TDa} \tag{12}$$

Speed at point m should not exceed speed V$_m$ as computed in Equation (12) in order to provide sufficient time to decelerate the ground vehicle to reach speed V$_c$ at tangent point T$_a$. The ground vehicle 104 can accelerate from tangent point T'$_b$ until speed V$_m$ or point m is reached. After point m, the vehicle will decelerate until tangent point T$_a$ or speed V$_c$ is reached.

Option II

The local motion planner 120 attempts to generate a speed profile wherein the ground vehicle 104 uses a nominal deceleration to decelerate speed V'$_c$ starting from tangent point T'$_b$. The ground vehicle 104 decelerates until tangent point T$_a$ or speed V$_c$ is reached.

Option III

The local motion planner 120 attempts to generate a speed profile by backtracking from tangent point T'$_b$ to point n, which is one second before tangent point T'$_b$ in the stored look-ahead position profile (point n can be on a curve). If the speed at point n, V$_n$, is less than or equal to speed V$_c$ no acceleration is applied from point n to tangent point T$_a$. If the speed V$_n$ is greater than speed V$_c$, the local motion planner uses the following equations to compute the required deceleration.

$$V_c = V_n + at \tag{13}$$

$$S = V_n t + \frac{1}{2}at^2$$

$$\therefore t = \frac{(V_c - V_n)}{a}$$

$$\Rightarrow S = V_n \frac{(V_c - V_n)}{a} + \frac{1}{2}a\frac{(V_c - V_n)^2}{a^2} \tag{14}$$

$$\Rightarrow S = \frac{1}{a}\left[V_n(V_c - V_n) + \frac{(V_c - V_n)^2}{2}\right]$$

$$\Rightarrow a = \frac{(V_c - V_n)}{S}\left[V_n + \frac{1}{2}(V_c - V_n)\right] \tag{15}$$

$$\Rightarrow a = \frac{(V_c^2 - V_n^2)}{2S}$$

where S, V$_n$, V$_c$ are known, V$_n$>V$_c$, and a and t are unknown. This option is repeated until one of: the magnitude of the required deceleration is less than or equal to the magnitude of the nominal deceleration and the overall speed profile can be achieved (i.e., speeds at curves are less than or equal to their respective curve speeds determined by the Fillet algorithm.) or the ground vehicle 104 backtracks to the current vehicle position.

Option IV

The local motion planner 120 attempts to generate a speed profile by backtracking from tangent point T'$_b$ to point n, which is a predetermined distance before tangent point T'$_b$. Maximum deceleration (e.g., the maximum deceleration possible by braking the ground vehicle 104) is used to decelerate the speed from point n. This option is repeated until the speed V$_c$ can be achieved at tangent point T$_a$ or at a location before tangent point T$_a$. The local motion planner 120 backtracks to the current vehicle position.

After a suitable speed profile is determined, trapezoidal integration is used to propagate position with the determined speed profile. For straight line segments of the path, the heading is held constant. During curves heading rate is computed as:

$$\dot{\psi} = \frac{V_c}{r} \tag{16}$$

Position and heading propagation are determined as:

$$\psi(t) = \psi(t-1) + \frac{\dot{\psi}(t-1) + \dot{\psi}(t)}{2}dt \tag{17}$$

$$x(t) = x(t-1) + \frac{\dot{x}(t-1) + \dot{x}(t)}{2}dt \tag{18}$$

$$y(t) = y(t-1) + \frac{\dot{y}(t-1) + \dot{y}(t)}{2}dt \tag{19}$$

where $$\dot{x} = V \sin \psi$$

$$\dot{y} = V \cos \psi$$

After the speed profile is determined, both position and speed profiles are saved into the look-ahead motion profile that provides guidance commands to the vehicle control system 108.

The motion planner 100 of the present invention, and the methods 200, 300 and 400 implemented thereby, may be implemented as programs of instructions such as software or firmware resident in the memory of the guidance system 102 of the unmanned ground vehicle 104 shown in FIG. 1. It is understood that the specific order or hierarchies of steps in the methods disclosed are examples of exemplary approaches. Based upon design preferences, it is understood that the specific order or hierarchy of steps in the method can be rearranged while remaining within the scope of the present invention. The attached method claims present elements of the various steps in a sample order, and are not meant to be limited to the specific order or hierarchy presented.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A motion planner for an unmanned ground vehicle, comprising:
   a global path planner configured to determine a path to reach a goal location, the path determined by the global path planner comprises a polygonal path, the polygonal path includes at least one discontinuity wherein the unmanned ground vehicle is required to change heading so that the polygonal path includes a first substantially straight path segment and a second substantially straight path segment, the second substantially straight path segment joining the first substantially straight path segment at the at least one discontinuity; and
   a local motion planner in communication with the global path planner configured to revise the path determined by the global path planner to generate a motion profile accounting for at least one constraint on maneuverability of the unmanned ground vehicle,
   said motion profile provides a revised path for being traversed by the unmanned ground vehicle to reach the goal location, the revised path created by the local motion planner comprises a smoothed path with at least one arc that complies with the at least one constraint on the maneuverability of the unmanned ground vehicle, the local motion planner creating the revised path based upon a curve speed of the unmanned ground vehicle following said at least one arc of the smoothed path and a turning rate of the unmanned ground vehicle, the curve speed of the unmanned ground vehicle being a highest speed following said at least one arc to avoid a rollover of the unmanned ground vehicle, the motion profile further including a speed profile whereby the unmanned ground vehicle decelerates to said curve speed while avoiding a rollover of the unmanned ground vehicle when beginning said at least one arc of the smoothed path and maintains said curve speed through said at least one arc.

2. The motion planner as claimed in claim 1, wherein the global path planner determines the path using predetermined terrain information and real-time sensor inputs.

3. The motion planner as claimed in claim 1, wherein the local motion planner determines three anchor points based on the polygonal path, the three anchor points being used for revising the polygonal path.

4. The motion planner as claimed in claim 3, wherein the three anchor points include a first anchor point comprising a current location of the unmanned ground vehicle or an end point of a previously saved motion profile, a second anchor point comprising a point at a distance from the at least one discontinuity of the polygonal path, and a third anchor point comprising a point on the second substantially straight path segment.

5. A method for planning a path for an unmanned ground vehicle, comprising:
   determining a path, via a global path planner, to be traversed by the unmanned ground vehicle to reach a goal location, the determined path comprises a polygonal path, the polygonal path includes at least one discontinuity wherein the unmanned ground vehicle is required to change heading so that the polygonal path includes a first path substantially straight segment and a second substantially straight path segment, the second substantially straight path segment joining the first substantially straight path segment at the at least one discontinuity; and
   generating a motion profile by revising the determined path to account for at least one constraint on maneuverability of the unmanned ground vehicle, the motion profile allowing traversal of a revised path by the unmanned ground vehicle to reach the goal location, the revised path comprises a smoothed path with at least one arc that complies with the at least one constraint on the maneuverability of the unmanned ground vehicle, the revised path based upon a curve speed of the unmanned ground vehicle following said at least one arc of the smoothed path and a turning rate of the unmanned ground vehicle;
   wherein the unmanned ground vehicle is suitable to traverse the revised path at a speed greater than the speed at which the unmanned ground vehicle is suitable to traverse the determined path, the curve speed of the unmanned ground vehicle being a highest speed following said at least one arc to avoid a rollover of the unmanned ground vehicle, the motion profile further including a speed profile whereby the unmanned ground vehicle decelerates to said curve speed while avoiding a rollover of the unmanned ground vehicle when beginning said at least one arc of the smoothed path and maintains said curve highest speed through said at least one arc.

6. The method as claimed in claim 5, wherein the determined path to be traversed by the unmanned ground vehicle is determined using stored terrain information and real-time sensor inputs.

7. The method as claimed in claim 5, wherein revising the determined path comprises determining three anchor points based on the polygonal path, the three anchor points being used for revising the polygonal path.

8. The method as claimed in claim 7, wherein the three anchor points include a first anchor point comprising a current location of the unmanned ground vehicle or an end point of a previously saved motion profile, a second anchor point comprising a point at a distance from the at least one discontinuity, and a third anchor point comprising a point on the second substantially straight path segment.

9. An unmanned ground vehicle, comprising:
a global path planner configured to determine a path to be traversed by the unmanned ground vehicle to reach a goal location, the path determined by the global path planner comprises a polygonal path, the polygonal path including at least one discontinuity where the ground vehicle is required to change heading so that the polygonal path includes a first substantially straight path segment and a second substantially straight path segment, the second substantially straight path segment joining the first substantially straight path segment at the discontinuity; and
a local motion planner in communication with the global path planner configured to revise the path determined by the global path planner to generate a motion profile accounting for at least one constraint on maneuverability of the unmanned ground vehicle, the motion profile providing a revised path for being traversed by the unmanned ground vehicle to reach the goal location, the revised path comprises a smoothed path with at least one arc that complies with the at least one constraint on the maneuverability of the unmanned ground vehicle, the local motion planner creating the revised path based upon a curve speed of the unmanned ground vehicle following act the at least one arc of the smoothed path and a turning rate of the unmanned ground vehicle;
said unmanned ground vehicle is configured to traverse the revised path at a speed greater than the speed at which the unmanned ground vehicle is configured to traverse the path determined by the global path planner, the curve speed of the unmanned ground vehicle being a highest speed following said at least one arc to avoid a rollover of the unmanned ground vehicle, the motion profile further including a speed profile whereby the unmanned ground vehicle decelerates to said curve speed while avoiding a rollover of the unmanned ground vehicle when beginning said at least one arc of the smoothed path and maintains said curve speed through said at least one arc.

10. The unmanned ground vehicle as claimed in claim 9, wherein the global path planner determines the path using predetermined terrain information and real-time sensor inputs.

11. The unmanned ground vehicle as claimed in claim 9, wherein the local motion planner determines three anchor points based on the polygonal path, the three anchor points being used for revising the polygonal path.

12. The unmanned ground vehicle as claimed in claim 11, wherein the three anchor points include a first anchor point comprising a current location of the unmanned ground vehicle or an end point of a previously saved motion profile, a second anchor point comprising a point at a distance from the discontinuity of the polygonal path, and a third anchor point on the polygonal path.

13. The motion planner as claimed in claim 1, wherein said constraint on the maneuverability of the unmanned ground vehicle includes at least one of acceleration limit and deceleration limit.

14. The method as claimed in claim 5, wherein said constraint on the maneuverability of the unmanned ground vehicle includes at least one of acceleration limit and deceleration limit.

15. The unmanned ground vehicle as claimed in claim 9, wherein said constraint on the maneuverability of the unmanned ground vehicle includes at least one of acceleration limit and deceleration limit.

* * * * *